(No Model.)
J. O. MINOR & J. J. HOOVER.
SUBSOIL PLOW.
No. 558,195. Patented Apr. 14, 1896.
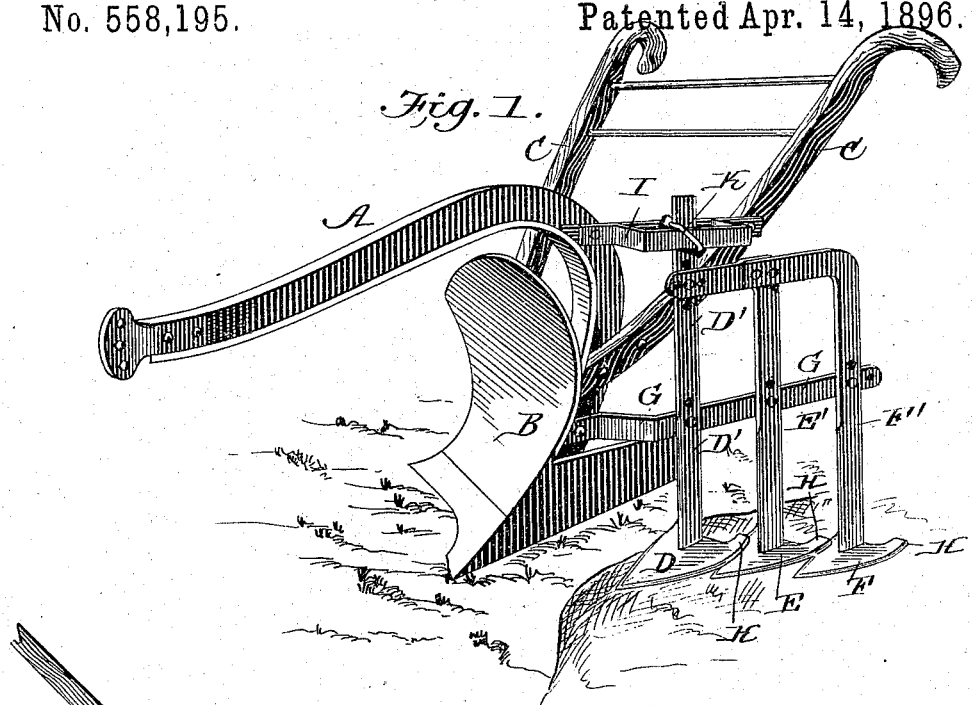
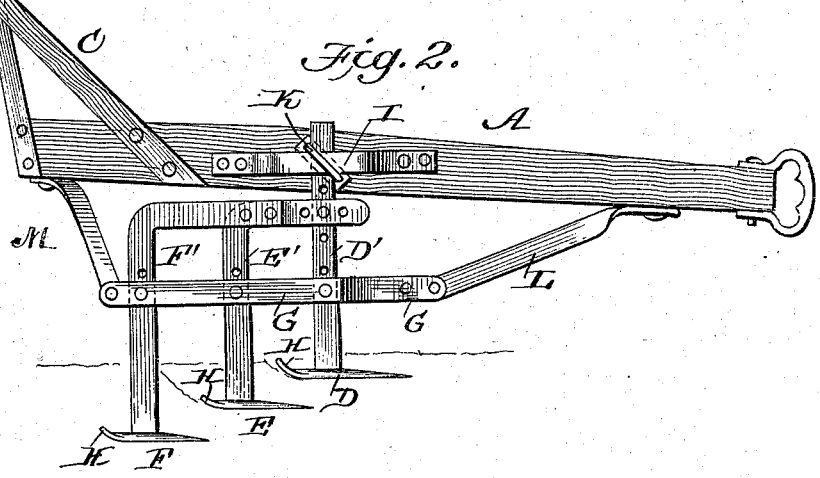
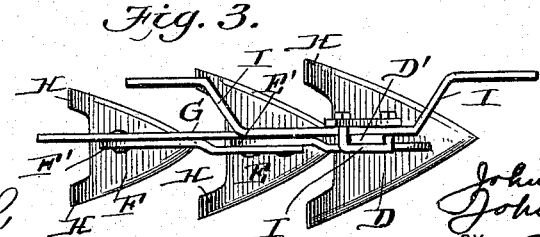

United States Patent Office.

JOHN OLONSO MINOR AND JOHN J. HOOVER, OF BAILEYVILLE, KANSAS.

SUBSOIL-PLOW.

SPECIFICATION forming part of Letters Patent No. 558,195, dated April 14, 1896.

Application filed August 21, 1895. Serial No. 560,038. (No model.)

*To all whom it may concern:*

Be it known that we, JOHN OLONSO MINOR and JOHN J. HOOVER, of Baileyville, in the county of Nemaha and State of Kansas, have invented an Improved Subsoil-Plow, of which the following is a specification.

This invention is an improved subsoiler adapted to be attached to the beam of a plow, and our improved subsoiler can be used either with or without any construction of plow.

The object of our invention is to provide a subsoiler which will cut the center of the furrow in an easy manner, and one which will serve to break the ground into small pieces.

With these objects in view our invention consists, essentially, in providing a series of subsoil-plows arranged in descending series toward the rear.

Our invention consists also in certain details of construction and combination of parts, all of which will be hereinafter fully described, and then pointed out in the claims.

In the drawings forming a part of this specification, Figure 1 is a view of our subsoiler attached to a moldboard-plow. Fig. 2 is a similar view showing the subsoiler used independent of any plow. Fig. 3 is a detail view of the subsoiler detached from the beam.

Referring to the drawings, A indicates the beam of the plow; B, the moldboard; C, the handles, all of which may be constructed in any suitable manner.

D, E, and F indicate the subsoilers, each mounted upon a standard D', E', and F', standard E' being connected with the standard D', and the standard F' being connected to the standard E', as clearly shown. These standards are, furthermore, attached to a draw-bar G below their points of attachment to each other.

The subsoilers D, E, and F are all constructed alike, and consist of a plate essentially triangular in shape, arched slightly at the rear end, constructed with the upwardly-projecting wings H, which serve to break the ground after the same has been turned up in thin strips by means of the subsoilers D, E, and F. By arranging said subsoilers in descending series it will be seen that a deep furrow is cut, and yet by cutting thin layers the operation is accomplished very easily, and there is very little extra draft placed upon the horse.

The forward end of each standard D', E', and F' is formed with a cutting edge near the subsoil-plow for the purpose of dividing the strip of earth preparatory to being broken by the rear wings H.

As before stated, our subsoiler is adapted to be used in connection with a moldboard-plow or independent thereof, as desired. When used in connection with the plow, as shown in Fig. 1, we employ an offset bracket I, which is attached to the plow-beam, and to which the standard D is attached by means of a suitable clip K. The forward end of the draw-bar is also attached to the plow-standard near the lower end thereof, said draw-bar being formed with an offset in order to bring the end in conjunction with the plow-standard.

In Fig. 2, wherein the subsoiler is shown independent of the plow, the bracket-arm I is attached to the side of the beam and the forward end of the draw-bar is connected to the beam by means of a supplemental arm L. The brace-arm M extends from the rear end of the draw-bar for the purpose of holding the subsoiler rigid from the side of the beam. The general construction of the subsoiler, however, is the same in both cases, and consists, essentially, of the points D, E, and F, the standards D', E', and F', and the draw-bar G. The same offset bracket is also employed, and the only difference between the two constructions is the employment of the supplemental arm L and the brace-arm M.

From the foregoing description, taken in connection with the accompanying drawings, the operation and advantages of our improved subsoiler will be apparent to every one skilled in the art to which it relates.

Having thus described our invention, what we claim, and desire to secure by Letters Patent, is—

1. The combination, with the plow-beam, of an offset bracket attached thereto, the subsoil-plows and standards to which they are attached, and the draw-bar connected to said standards and to the plow-beam, substantially as shown and described.

2. The combination, with the plow-beam, with the offset bracket, the subsoil-plows, and their standards connected to each other, the draw-bar connected with the standards, the supplemental arm, and the brace-rod and brace-arm, all arranged substantially as shown and described.

In testimony whereof we affix our signatures in the presence of two witnesses.

JOHN OLONSO MINOR.
JOHN J. HOOVER.

Witnesses:
J. L. HOOVER,
W. H. STALL.